March 17, 1964     H. M. VALENTINE     3,125,379
VARIABLE PRESSURE RATIO VALVE

Filed Dec. 28, 1960     4 Sheets-Sheet 1

INVENTOR
HARRY M. VALENTINE

BY *Scrivener & Parker*

ATTORNEYS

March 17, 1964 H. M. VALENTINE 3,125,379
VARIABLE PRESSURE RATIO VALVE
Filed Dec. 28, 1960 4 Sheets-Sheet 2
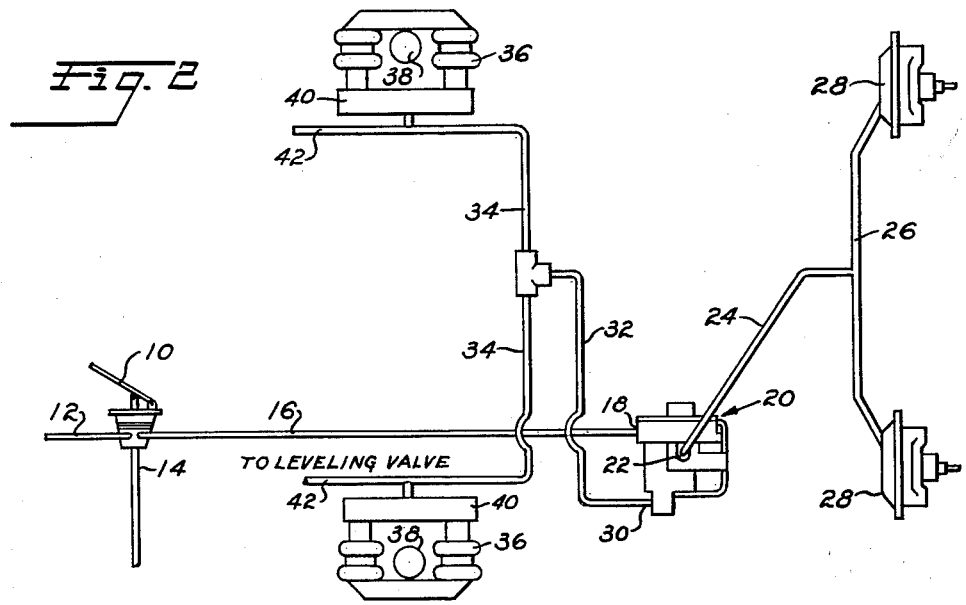
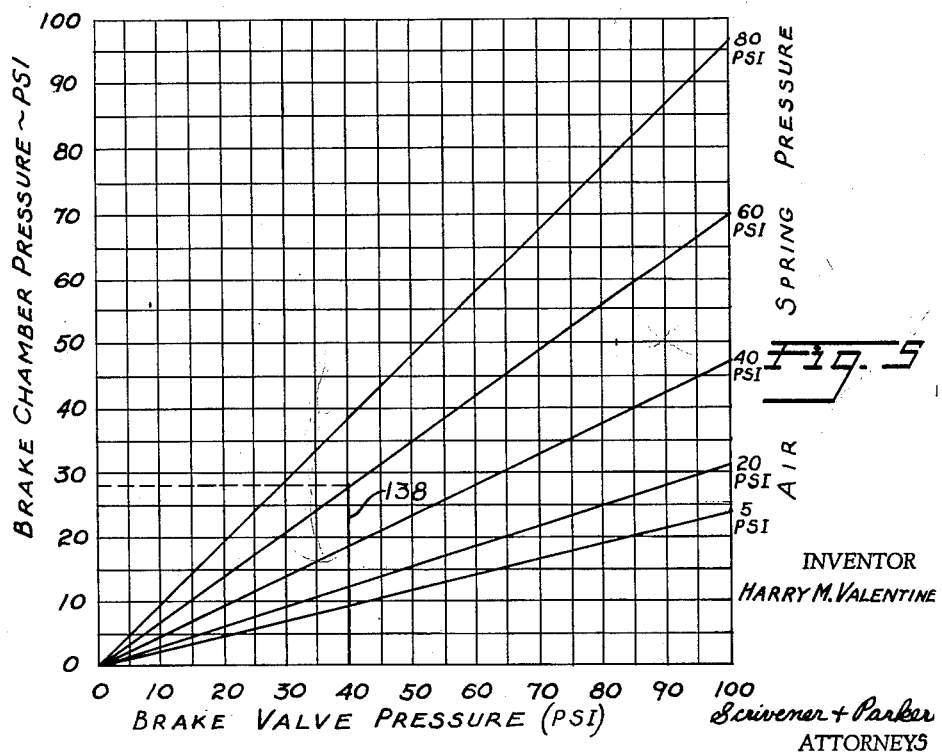
BRAKE CHAMBER PRESSURE VS. BRAKE VALVE
PRESSURE AT VARIOUS AIR SPRING PRESSURES
INVENTOR
HARRY M. VALENTINE
Scrivener + Parker
ATTORNEYS March 17, 1964

H. M. VALENTINE 3,125,379

VARIABLE PRESSURE RATIO VALVE

Filed Dec. 28, 1960

INVENTOR
HARRY M. VALENTINE

BY *Scrivener & Parker*

ATTORNEYS

March 17, 1964

H. M. VALENTINE 3,125,379

VARIABLE PRESSURE RATIO VALVE

Filed Dec. 28, 1960

INVENTOR
HARRY M. VALENTINE

BY Scrivener & Parker

ATTORNEYS

United States Patent Office 3,125,379
Patented Mar. 17, 1964

3,125,379
VARIABLE PRESSURE RATIO VALVE
Harry M. Valentine, Elyria, Ohio, assignor to Bendix-Westinghouse Automotive Air Brake Company, Elyria, Ohio, a corporation of Delaware
Filed Dec. 28, 1960, Ser. No. 78,933
18 Claims. (Cl. 303—60)

This invention relates to valves an more particularly to a fluid pressure-control valve of the variable pressure ratio variety.

The present invention is concerned with the provision of a control valve which is particularly, though not exclusively, suited for use in pneumatic braking systems of the type wherein a manually operated control valve, such as the usual foot operated valve used in the braking systems of automotive vehicles, controls the supply of fluid pressure from a source to the vehicle brake chambers. The broad object of the present invention is to provide a control valve, between the manually operated valve and the brake chambers, which can effect a reduction in brake chamber pressure from that supplied by the brake valve such as to produce a pressure ratio between the two which will be in proportion to the load on the vehicle.

Variable pressure ratio valves responsive to vehicle loading for limiting brake chamber pressure have been known in the art. However, the valves of the prior art have usually been of the type which limit the brake chamber delivery pressure in accordance with a predetermined loading on the vehicle so that the supply of presusre to the brake chamber is positively cut off after the brake valve pressure exceeds the predetermined pressure and after this pressure has been reached further movement of the brake valve towards the open position results in no further delivery of pressure to the brake chamber. A typical valve of this general nature is shown in the patent to Bell, No. 2,150,576. It will be apparent that a valve of this nature is disadvantageous because the operator loses control of the brakes whenever the brake valve pressure exceeds a predetermined pressure determined by the load on the vehicle. An object of the present invention therefore is to provide a proportional braking valve which will overcome the foregoing disadvantage and permit the operator to continue to supply pressure to the brake chambers throughout the entire range of brake valve movement with the brake chamber pressure, however, being proportionately less than the brake valve pressure, depending upon the load on the vehicle.

Endeavors to overcome the disadvantages of the limiting type of valve shown in the mentioned patent to Bell, have involved the use of multi-area pistons wherein one of the areas is subjected at all times to a pressure or a force which is proportional to the loading of the vehicle. This load proportional pressure is frequently derived from an air spring and this pressure acts on the appropriate area of the piston to retain it in a fixed position until such time as the brake valve pressure exceeds the air spring pressure whereupon, for all brake valve pressures in excess of the air spring pressure, proportional braking takes place. The disadvantage of this type of valve is that for brake valve pressures less than the air spring pressure, there is no proportional braking and it is thus possible for the operator to deliver to the brake chambers greater pressure than is required for the prevailing conditions and the wheels thus may be prematurely locked resulting in dangerous skidding. It is an object of the present invention to overcome this disadvantage by the provision of a variable pressure ratio controlled valve which will uniformly proportion brake chamber pressure to brake valve pressure in accordance with the load on the vehicle throughout the full range of movement of the brake valve from its fully closed to its fully opened positions.

A further object of the invention is to provide a valve which accomplishes the foregoing and includes diaphragm follower elements constructed in a manner whereby the maximum ratio of the effective areas result with the minimum of overall diameter.

Other objects and their attendant advantages will become apparent as the following detailed description is read in conjunction with the accompanying drawings wherein:

FIG. 2 is a schematic diagram showing the valve of the present invention incorporated in a fluid pressure brake system;

FIG. 5 is a graphical representation showing the mode of operation of the device of the invention under varying pressure conditions.

Figure 1:
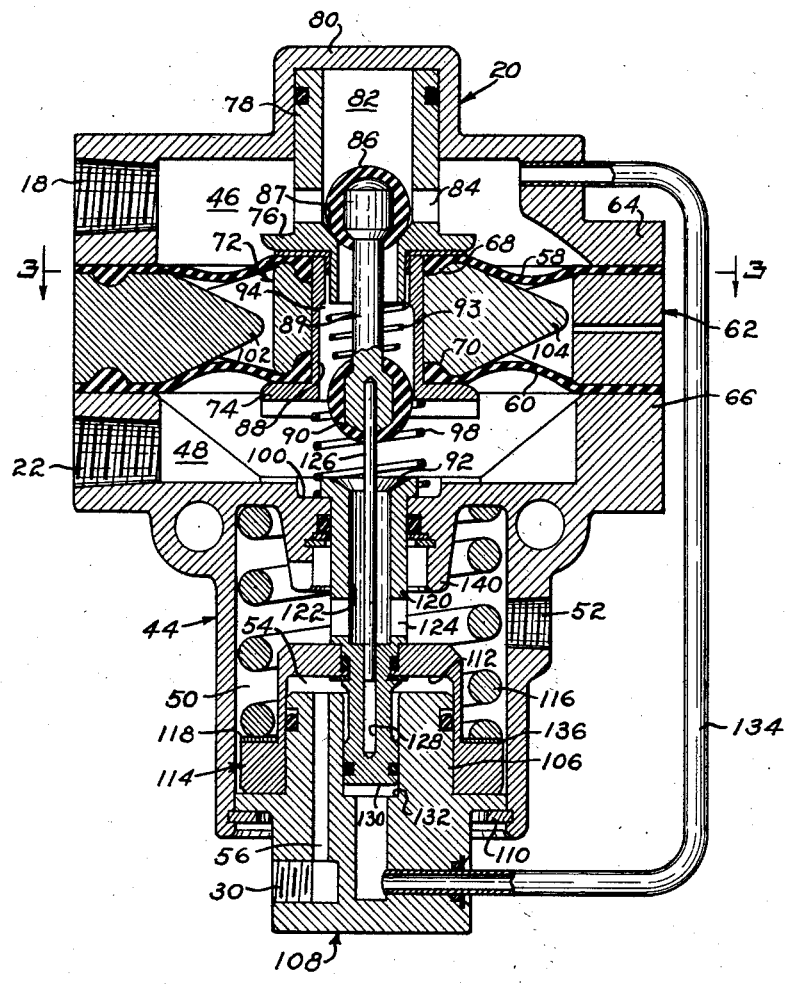
FIG. 1 is a vertical cross sectional view of a variable pressure ratio valve constructed in accordance with the present invention.

Referring now to the drawings, and particularly to FIG. 2, there is illustrated a fluid pressure braking system having a pedal-operated brake valve 10, preferably of the self-lapping variety, which is connected by a conduit 12 to a source of fluid pressure (not shown). The valve 10 has the usual exhaust 14 and an outlet port which is connected by a conduit 16 to the inlet port 18 of a variable pressure ratio valve 20 which is constructed in accordance with the invention and hereinafter described in detail. The valve 20 has a delivery port 22, which is connected by conduits 24, 26 to a pair of brake chambers 28 and a control port 30 which is connected by way of conduits 32, 34 to a pair of conventional air springs 36 disposed between an axle or unsprung part 38 of the vehicle and the chassis or sprung part 40 of the vehicle. Each air spring 36 is adapted to be supplied with fluid pressure by means of a conluit 42 and a conventional leveling valve (not shown) which is responsive to vehicle loading to supply or exhaust fluid pressure to or from the air springs in accordance with changes in the load on the vehicle. It will be understood by those skilled in the art that when the vehicle load is decreased the springs 36 expand so as to move chassis 40 upwardly with respect to axle 38. This movement actuates control levers connected to the leveling valves which are moved to exhaust position to release pressure in the springs 36 until the chassis is lowered to its predetermined height above the axle at which position the leveling valves are moved by the control lever to a lap position so that no further air is exhausted from the springs. Should the load be increased, the reverse of the above action would take place resulting in increased pressure in the air springs to raise the chassis upwardly to the abovementioned predetermined height above the axle.

The purpose of the variable pressure ratio valve is to control the air pressure delivered to the brake chambers in proportion to the vehicle load as determined by the pressure in the air springs. With particular reference to FIG. 1, it will be observed that the valve 20 comprises a casing 44 whose interior is divided into an inlet chamber 46 connected by way of port 18 to the brake valve 10, a delivery chamber 48 connected by way of port 22 to the brake chambers, an exhaust chamber 50 connected by way of port 52 to atmosphere and a control chamber 54 connected by way of port 30 and passage 56 to the air springs. Interposed between the inlet and delivery chambers 46, 48 is a diaphragm and valve assembly comprising a pair of spaced variable effective area diaphragms 58, 60 whose outer peripheral edges are clamped between a fixed annular member 62 and respective upper and lower parts 64, 66 of the valve casing 44. The diaphragms are centrally apertured and are provided with inner annular beads 68, 70 which are clamped between a central annular member 72 and upper and lower hollow members 74, 76 which are joined to each other and to the central member 72 in any convenient manner as by a force fit or the like. The member 76 has an integral cylindrical upper part 78 which is slideably received in a guide member 80 and contains a chamber 82 connected to the inlet chamber 46 by way of a series of ports 84. Within chamber 82 is a supply valve 86 which controls a valve seat 87 at the upper end of a passage 88 interconnecting inlet and delivery cavities 46, 48. The valve 86 is connected by a stem portion 89 to a valve member 90 which is adapted to control an exhaust valve seat 92 as hereinafter described. The supply valve 86 is normally retained in its closed position of the drawing by means of a spring 93 interposed between a shoulder 94 and the exhaust valve 90 so that the inlet chamber 46 is out of communication with delivery chamber 48 by way of the passage 88 through the members 74, 76. Additionally, the diaphragms and parts connected thereto are normally retained in the position of FIG. 1 by means of a spring 98 interposed between a recess 100 in the central lower wall of chamber 48 and the lower side of the member 74, the upward movement of the diaphragm assembly being limited by engagement of the upper annular edge of part 78 with the upper wall of the guide member 80.

Figure 3:
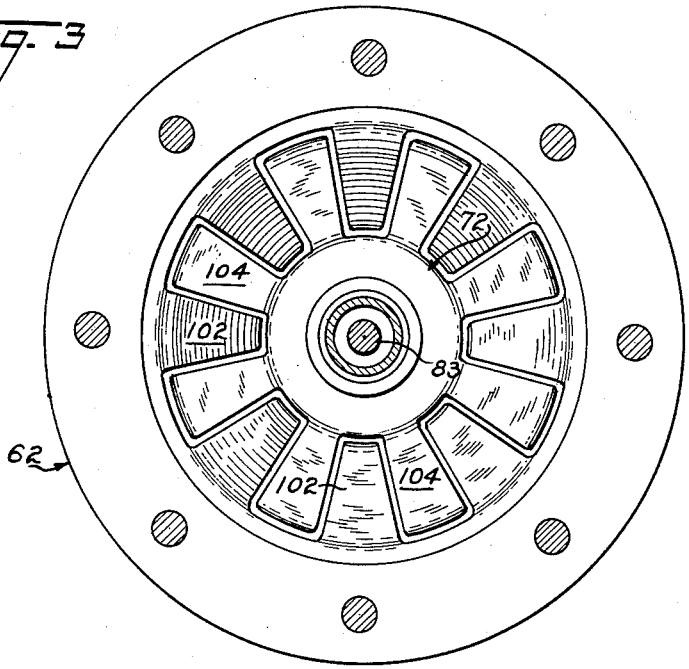
FIG. 3 is a horizontal cross sectional view taken substantially on the line 3—3 of FIG. 1.
Figure 4:
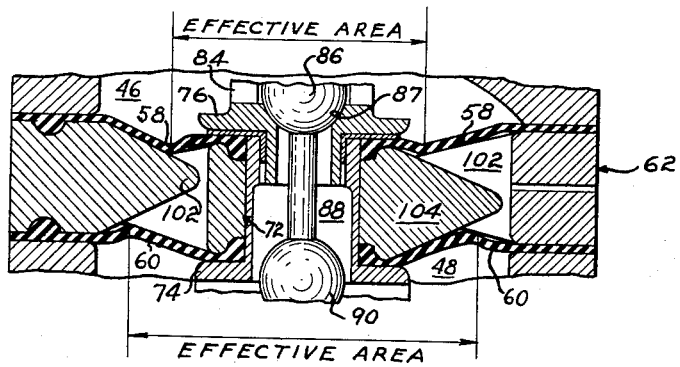
FIG. 4 is a broken cross sectional view showing a portion of the device shown in FIG. 1 in changed position.

Referring now to FIG. 3, it will be observed that the fixed annular clamping member 62 and the central member 72 are each provided with respective complementary inwardly and outwardly radially extending interlocking fingers 102, 104 each of which is pyramidal in vertical cross section as illustrated in FIGS. 1 and 4, the arrangement being such that the member 72 acts as a diaphragm follower so that when the diaphragms are moved downwardly by the admission of pressure to chamber 46 the upper diaphragm 58 lays downwardly on the relatively stationary fingers 102, thereby decreasing the effective area of the upper diaphragm, and at the same time the lower diaphragm 60 is pulled away from the stationary fingers 102 by the action of the fingers 104 so that the effective motive area of the lower diaphragm 60 is increased proportionately as the area of the upper diaphragm is decreased.

Interlocking the fingers 102 and 104 as shown affords the maximum change in ratio of effective areas per fraction of an inch of vertical displacement. Also, by interlocking the fingers as opposed to having the points of the fingers practically in abutting position; the maximum ratio of effective areas results with the minimum of unit outside diameter. Due also to the effective support of the diaphragm, as a result of the interlocking fingers design, the service life of the diaphragms are improved and their consistency of the physical output remain constant throughout their life.

Referring now to FIG. 1 and to the control chamber 54 which is connected to the air springs as previously mentioned, the lower wall of the chamber is formed by the upper annular edge of a reduced diameter part 106 of a lower closure member 108 which is retained within the exhaust chamber 50 by means of a conventional snap ring 110. The upper wall of chamber 54 is formed by the lower wall 112 of a cup-shaped member 114 which is slidingly received over the reduced diameter part 106 of member 108 and urged to the position of the drawing by means of a relatively heavy graduating spring 116 interposed between a flange 118 of the cup-shaped member 114 and the upper wall of the exhaust chamber 50. Integrally connected to the member 114 is a plunger member 120 having an interior passage 122 whose upper end defines the aforementioned exhaust valve seat 92 and whose lower end is connected by way of ports 124 with the exhaust chamber 50. As previously mentioned, the seat 92 is controlled by the valve 90 and, if desired, said valve may be protected against cocking by a small guide plunger 126 which extends downwardly through the passage 122 and is slidingly received in a bore 128 in an extension 130 of plunger 120 which is slidingly received in a recess 132 in the member 108. The plunger 120 is connected in any convenient manner to cup-shaped member 114 for simultaneous movement therewith and by constructing extension 130 with a diameter equal to the diameter of inlet valve seat 87 between the inlet and delivery chambers and then connecting the lower face of extension 130 to the pressure prevailing in the inlet chamber 46 as by the conduit 134, it will be observed that any pressure in the inlet cavity 48 tending to retain valve 90 in its seated condition will be balanced by inlet pressure acting on the lower face of member 130, so that when the valves 86, 90 are in lapped condition, as will become apparent hereinafter, the pressures acting downwardly and upwardly on plunger 120 will be cancelled out and the valve springs 93, 98 can be relatively quite light so as to have substantially no effect on the response of the valve to pressure changes.

From the foregoing it should be apparent that when the air spring pressure admitted to chamber 54 exceeds the loading of spring 116, which loading can be varied by the addition of shims 136 to the flange 118 of the cup-shaped member 114, the member 112 moves upwardly thereby moving plunger 120 and hence exhaust seat 92 upwardly to the same extent to a position determined by spring loading at which position seat 92 remains and thus affords a valve actuating member for the inlet and ehxaust valves 86, 90 so long as the pressure in the air spring is unchanged. Assuming, for example, that the air spring pressure is 50 p.s.i. and the exhaust seat is moved to and retained in a position intermediate the lower wall of the delivery chamber 48 and the lower end of the exhaust valve 90 and assuming that the brake pedal 10 is depressed to a position whereby the brake valve delivers 40 p.s.i. to the inlet cavity 46, the diaphragm assembly including the supply and exhaust valves 86, 90 are moved downwardly until the exhaust valve 90 engages the exhaust seat 92 to cut off communication between the delivery and exhaust cavities 48, 50. Continued downward movement of the diaphragm assembly causes the supply valve 86 to be unseated and admit pressure from the inlet chamber 46 to the delivery chamber 48 and thence to the brake chambers 28 by way of port 22 and conduits 24, 26.

With reference, now to FIG. 4, it will be seen that as the diaphragm assembly moves downwardly, the upper diaphragm 58 progressively lays down on the fingers 102 of the stationary annular member 62 thereby decreasing the effective motive area of the upper diaphragm by so much as is in actual engagement with the fingers 102. Simultaneously, the lower diaphragm 60 is moved off of the stationary fingers 102 thereby increasing the effective motive area of the lower diaphragm 60. This increased area of the lower diaphragm is ineffective until such time as the exhaust valve is closed and the supply valve 86 is open to admit inlet pressure to the delivery chamber 48 whereupon after a predetermined pressure, less than the inlet pressure, has been delivered to the brake chambers the pressure in the latter, and hence in the delivery cavity, acting on the increased effective area of the lower diaphragm causes the diaphragm assembly to move upwardly until the supply valve 86 is closed and no further pressure can be supplied to the delivery chamber and the valve members 86, 90 thus lap with both in closed position.

In the foregoing example it has been assumed that a 50 p.s.i. air spring pressure caused the exhaust valve seat 92 to be located midway between the exhaust valve 90 and the bottom wall of the delivery chamber 48. In the event that the air spring pressure is something less than 50 p.s.i. then the exhaust valve seat will be raised a proportionately less distance and the diaphragm assembly will have to move down a greater amount before the exhaust valve 90 engages the seat 92 and the supply valve 86 is raised from its seat. Under these circumstances, it will be apparent that a major portion of the upper diaphragm 58 will be deactivated by engagement with the fingers 102 whereas a substantial part of the lower diadiaphragm 60 will become effective because a majority of it has been moved clear of the stationary fingers. Thus, a relatively quite small pressure acting on the large area of the lower diaphragm 60 will be sufficient to overcome a relatively much higher pressure acting on the quite small effective area of the upper diaphragm 58 so that the valve members lap after only sufficient pressure has been delivered to the brake chambers to produce a braking effect which is proportional to the load on the vehicle as determined by the pressure in the air spring.

The foregoing example can be fully understood by reference to the graph of FIG. 5 which shows the relationship of brake chamber pressure to brake valve pressure at various air spring pressures. For example, by following line 138 on the gaph it will be seen that with an air spring pressure of 60 p.s.i. and a brake valve pressure of 40 p.s.i. the brake chamber pressure is 28 p.s.i. For a 20 p.s.i. air spring pressure and an 80 p.s.i. brake valve pressure the brake chamber pressure is but 25 p.s.i. Under the circumstances of the last example it can be assumed that the vehicle is lightly loaded and that the operator, because of an unexpected emergency, tramped suddenly down on the brake pedal so as to admit almost full reservoir pressure into the brake service line 16 and if this same pressure were permitted to flow directly into the brake chambers the wheels could be expected to become immediately locked and the vehicle thereby thrown into a dangerous skid. However, because of the proportioning action of the valve of the invention the maximum pressure that can be admitted to the brake chambers under a 20 p.s.i. air spring loading is less than one-third of the pressure supplied by the brake valve and this condition prevails as a straight line function from the lowest amount of pressure that can be supplied by the brake valve up to the highest available pressure which would be full reservoir pressure.

Where the vehicle is fully loaded with the air spring pressure being at a maximum, say 80 p.s.i. as indicated in the graph in FIG. 5, the valve seat 92 moves upwardly until the upper side wall of cup-shaped member 114 engages a downwardly projecting annular part 140 in the exhaust chamber 50 at which point seat 92 is moved into extremely close proximity to the exhaust valve 90 so that when brake valve pressure flows into inlet cavity 46 the diaphragm assembly need move downwardly only a very slight amount to lift the valve 86 off its seat. Because such slight movement of the diaphragm is required the effective areas of the respective diaphragms 58, 60 remain substantially the same and hence the pressure delivered to the brake chambers is very nearly equal to the pressure supplied by the brake valve and to all intents and purposes, under conditions of heavy loading, the braking system operates in substantially the same manner as if there were no proportional valve between the brake valve and the brake chambers.

Under any conditions of loading, after the brakes have been applied and the valve members are in lapped condition, when the brake valve is partially released the total force acting on the lower side of the diaphragm assembly exceeds the force acting on the upper side of the diaphragm assembly so that the entire assembly moves upwardly until the exhaust valve 90 is lifted clear of the seat 92 so as to connect the brake chambers to atmosphere cavity 50 whereupon the pressure below the diaphragm assembly falls to a point where the assembly again moves downwardly until the valves are once again in lapped condition. When the brake pedal is fully released so that all pressure is removed from the upper side of the diaphragm assembly, the parts of the valve of the invention take the position of FIG. 1 wherein the exhaust valve 90 is fully opened and the brake chambers are freely connected to atmosphere so that the brakes become fully released.

Figure 6:
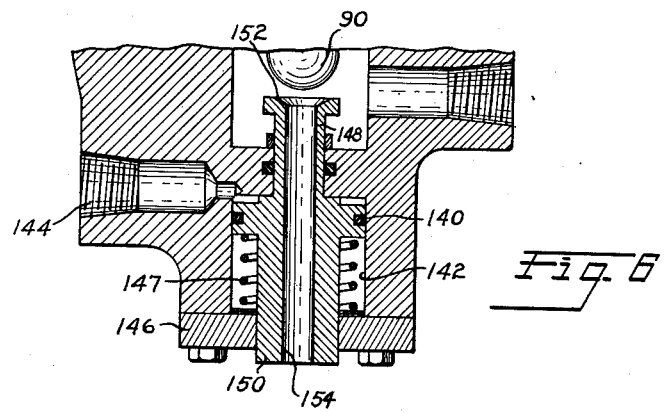
FIG. 6 is a broken cross sectional view showing a second embodiment of the present invention.

The embodiment of the invention illustrated in FIG. 6 is substantially identical in all respects to the embodiment shown in FIG. 1 except that the member for controlling the position of the exhaust valve seat responds to pressure which is inversely proportional to vehicle load and is normally urged, in a no-air condition, towards its upper or heavily-loaded position rather than to its lower or vehicle light load position as in the embodiment of FIG. 1. An advantage of this arrangement is that in the event of failure of control pressure, the exhaust valve seat is moved automatically to the uppermost position so that the valve seat is engaged by the exhaust valve member after only slight downward movement of the diaphragms and the inlet valve is immediately thereafter unseated to admit brake valve pressure to the brake chambers as previously described for a fully loaded vehicle with substantially no proportioning of the pressure delivered to the brake chambers. In other words, upon failure of the springs or upon failure of control pressure, the brake system operates substantially as if the proportioning valve were not in the system and the operator has full control of the brakes over the entire available range of braking pressure.

The structure of FIG. 6 accomplishes the foregoing by the provision of a piston member 140 which is slideable in a cavity 142 and has its upper surface exposed at all times by way of a control port 144 to pressure which is inversely proportioned to vehicle loading. The lower end of cavity 142 is closed by a cap member 146 and interposed between the upper surface of the cap member and the lower side of the piston 140 is a spring 147 which normally urges the piston 140 to the upper position of the drawing in opposition to control pressure acting on the upper side of the piston. Integrally connected to the piston 140 are upper and lower plunger parts 148, 150, the former of which extends into the delivery cavity and terminates in an exhaust valve seat 152, and the latter of which extends through a suitable aperture in the cap member 146 and is exposed to atmosphere. Extending through the plunger parts 148, 150 and the piston member 140 is a passage 154 which serves to connect the delivery cavity and hence the brake chambers to atmosphere upon a decrease in the pressure delivered by the brake valve.

From the description it will be apparent that the graduating means for determining proportionate pressures does not at any time act directly on any of the elements which move in direct response to either brake valve or brake chamber pressure. Thus, brake valve pressure need never exceed air spring pressure or other graduating force before proportioning takes place. Therefore, the valve of the invention is capable of supplying proportionate pressure to the brake chambers.

Figure 7:
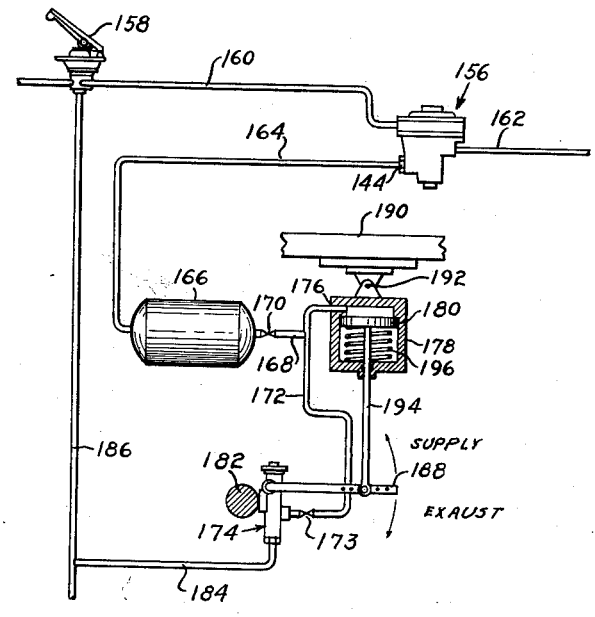
FIG. 7 is a schematic diagram showing the valve of FIG. 6 incorporated in a fluid pressure brake system.

Pressure inversely proportional to vehicle loading may be delivered to the control port 144 of the embodiment of the valve of FIG. 6 by any of a variety of means, a specific system for accomplishing this being disclosed in FIG. 7 which shows the valve of the invention incorporated in a brake system on a vehicle having conventional steel springs. The proportional valve in FIG. 7 is indicated by the numeral 156 and it receives pressure from a brake valve 158 by way of a conduit 160 and from valve 156 pressure is delivered to the brake chambers (not shown) by way of a conduit 162. Pressure which is inversely proportional to vehicle loading is delivered to control port 144 by way of a conduit 164, which may contain an auxiliary reservoir 166 and a choke 170 for purposes of damping over-the-road fluctuations, which is connected to a branch conduit 172 connected in turn through a choke 173 to a leveling valve 174. Connected to branch conduit 172 is a second branch conduit 176 which is connected to a cylinder 178 containing a piston 180 whose function will become apparent.

The leveling valve 174 may be identical to conventional leveling valves which control the supply of air to air springs on vehicles so equipped, except that the valve 174 is desirably connected directly to the axle 182 of the vehicle in an inverted position and is connected by way of conduit 184 to a conduit 186 which is connected at one end to the main reservoir of the vehicle (not shown) and at the other to the brake valve 158. The valve 174 is provided with the usual lever 188 which when moved in a counterclockwise direction in FIG. 7 serves to admit pressure from the main reservoir to branch conduit 172 and when the lever 188 is moved in a clockwise direction it serves to connect conduit 172 to atmosphere. The cylinder 178, previously referred to, is connected to the vehicle frame 190 by means of any suitable, preferably adjustable connection 192 and the piston 180 is connected by means of piston rod 194 to the lever 188 substantially as shown. A spring 196 is contained within the cylinder 178 and normally urges the piston 180 towards its upper position shown in the drawing.

In operation, with the vehicle lightly loaded and the piston 180 in an intermediate position, when the load on the vehicle is increased, the vehicle springs are initially partially collapsed by the load and the vehicle frame 190 moves closer to the axle 182. Upon this occurrence the cylinder 178 is likewise moved downwardly thus causing the piston 180 and piston rod 194 to move downwardly to rotate lever 188 of valve 174 in a clockwise direction thereby exhausting pressure from the auxiliary reservoir 166 and hence the control chamber 142 of the proportional valve 156. As the pressure continues to escape, the force of spring 196 acting on the lower side of piston 180 causes the latter to move upwardly until the lever 188 is moved to a lapped position wherein no further fluid pressure can flow either to or from the proportioning valve.

It will be apparent to those skilled in the art that when load is removed from the vehicle so that the frame moves upwardly the lever 188 is moved counterclockwise to increase the pressure in the control chamber of the proportioning valve which pressure also acts on top of the piston 180 to move it downwardly against the force of spring 196 until the lever 188 is again moved to its lapped position whereupon the flow of fluid pressure to the proportioning valve and to the piston 180 is cut off.

From the foregoing description of the operation of FIG. 7 it will be apparent that whenever the load on the vehicle is increased the pressure in the proportioning valve is decreased and vice versa so that the exhaust valve seat 152 is positioned with respect to the exhaust valve 90 in inverse relationship to the load in the vehicle. The system has been described in connection with a vehicle having steel springs. It will be apparent that the valve of FIG. 6 is equally applicable to use with vehicles having air springs in which event it would be desirable to provide in the system an inverter valve which delivers pressure inversely proportional to air spring pressure to the control chamber of the proportional valve 156. Regardless of whether steel or air springs are employed, in the event of sudden loss of control pressure to the valve of FIG. 6, it will be apparent that the pitson 140 will move immediately to its upper or vehicle-loaded position so that the brake system can be operated as if the proportional valve were not in the system.

Two embodiments of the invention have been shown and described. It will be apparent to those skilled in the art, that the invention is susceptible of a variety of changes and modifications without, however, departing from the scope and the spirit of the appended claims.

What is claimed is:

1. A proportioning valve comprising a casing having an inlet port, a delivery port, and an exhaust port, valve means in said casing for controlling the flow of fluid pressure between said ports, said valve means being arranged to connect said inlet and delivery ports after the latter has been disconnected from said exhaust port and to connect said delivery port to said exhaust port only after said delivery port has been disconnected from said inlet port, and said valve means including a normally closed inlet valve for normally interrupting the connection between the inlet and delivery ports, and means for controlling said valve means comprising a pair of opposed diaphragms each respectively exposed to the pressure at said delivery port and the pressure at said inlet port, said diaphragms being spaced apart while being interconnected for simultaneous movement, relatively fixed inwardly converging inclined surfaces between said diaphragms so arranged that as the diaphragms are moved in response to fluid pressure at said inlet one diaphragm lays along the inclined surface thereby decreasing the effective area thereof whereas the other diaphragm is moved away from said inclined surface thereby increasing the effective area thereof.

2. A variable pressure ratio valve device comprising a casing having an inlet port and a delivery port, a valve in said casing, a valve actuating member in said casing, said valve and valve actuating member being movable relative to each other and cooperating to control the flow of fluid between said inlet and delivery ports, said valve including a normally closed valve member normally interrupting the flow of fluid between said ports, a pair of opposed pressure responsive diaphragms for controlling the relative movement between said valve and said valve actuating member, each of said diaphragms having a variable effective area exposed respectively to the pressure at said inlet and delivery ports, said diaphragms being arranged that as the effective area of the diaphragm exposed to the pressure at the inlet port is decreased, the effective area of the diaphragm exposed to the pressure at the delivery port is increased and vice versa.

3. The valve device of claim 2 including means for adjusting the position of the valve actuating member with respect to said valve.

4. A variable pressure ratio valve device comprising a casing having an inlet port, a delivery port, and an exhaust port, a valve in said casing, a valve seat member in said casing, said valve and valve seat member being movable relative to each other and cooperating to control the flow of fluid alternatively between said inlet and delivery ports and between said delivery and exhaust ports, said valve including a normally closed valve member normally interrupting the flow of fluid between said inlet and delivery ports, a pair of opposed pressure responsive diaphragms for controlling the relative movement between said valve and said valve seat member, each of said diaphragms having a variable effective area exposed respectviely to the pressure at said inlet and delivery ports, said diaphragms being arranged that as the effective area of the diaphragm exposed to pressure at the inlet port is decreased, the effective area of the diaphragm exposed to pressure at the delivery port is increased and vice versa.

5. A variable pressure ratio valve device comprising a casing having an inlet port, a delivery port, and an exhaust port, a valve in said casing, a valve seat member in said casing, the position of said valve seat member being adjustable with respect to said valve member and cooperating with said valve member to control the flow of fluid alternatively between said inlet and delivery ports and between said delivery and exhaust ports, said valve including a normally closed valve member normally interrupting the flow of fluid between said inlet and delivery ports, a pair of pressure-responsive diaphragms for controlling the movement of said valve member, each of said diaphragms having a variable effective area exposed respectively to the pressure at said inlet and delivery ports, the diaphragms being arranged that as the effetcive area exposed to pressure at the inlet port is decreased the effective area exposed to pressure at the delivery port is increased and vice versa.

6. A load responsive valve, comprising a casing having an inlet port, a delivery port and an exhaust port, first valve and valve seat members in said casing for controlling the flow of fluid from said inlet to said delivery port, said valve and valve seat members being normally closed, a second valve member connected to said first valve member, a second valve seat member cooperating with said second valve member for controlling the flow of fluid from said delivery port to said exhaust port, said second valve member and said second valve seat member being normally open, a pair of opposed diaphragms operatively connected to said first and second valve members for effecting movement of said members into and out of engagement with their respective seat members, said valve members being arranged that said second valve member engages its seat member before the first valve member disengages its seat member and vice versa, said diaphragms having variable effective areas respectively exposed to the pressures at said inlet and delivery ports and arranged that as the effective area of the diaphragm exposed to pressure at the inlet port is decreased the effective area of the diaphragm exposed to the pressure at the delivery port is increased and vice versa, and means for varying the position of said second valve seat member with respect to said second valve member.

7. The valve of claim 6 wherein said opposed diaphragms are spaced apart and interconnected for movement in unison in either of two opposing directions and including a pair of relatively stationary oppositely directed inclined surfaces between said diaphragms, each of said surfaces being adapted to be progressively engaged and disengaged by the respective diaphragms upon movement thereof so as to progressively change the respective effective sizes of the pressure responsive areas of said diaphragms.

8. The valve of claim 7 wherein said inclined surfaces are afforded by a series of fingers extending radially inwardly and whose opposite surfaces converge from their outer toward their inner ends, and a follower member interconnecting said diaphragms, said follower member including a series of fingers extending radially outwardly in interlocking relationship with said first mentioned fingers, said second mentioned fingers having opposite surfaces which converge from their inner towards their outer ends.

9. The valve of claim 6 wherein the varying means comprises a fluid pressure responsive element subjected on one side to fluid pressure, and on the other side to a spring.

10. The valve of claim 9 wherein said spring acts on said element so as to urge said second valve seat member in the direction of said second valve member.

11. A fluid pressure control valve comprising a casing having inlet, delivery and exhaust ports, a pair of spaced diaphragms in said casing each having motive areas exposed respectively to the pressure at said inlet and at said delivery ports, said diaphragms being movable in unison in either of two opposing directions in response to changes in pressure at said inlet port, a pair of oppositely directed inclined surfaces in said casing each being adapted to be progressively engaged and disengaged by the respective diaphragms upon movement thereof so as to progressively change the effective size of the motive areas which are responsive to the respective fluid pressures at said inlet and delivery ports, and valve means responsive to the movement of said diaphragms for controlling connections between said inlet, delivery and exhaust ports, said valve means including a normally closed inlet valve for interrupting the connection between the inlet and delivery ports.

12. A fluid pressure control valve comprising a casing having a pair of fluid pressure chambers, normally closed valve means movable between open and closed positions for controlling the flow of fluid pressure between said chambers, a pair of spaced diaphragms each having a motive area exposed respectively to the pressures in said chambers, said diaphragms being operatively connected to said valve means and movable in unison in response to changes in pressure in the respective chambers so as to effect movement of said valve means between open and closed positions, and a pair of relatively stationary oppositely directed inclined surfaces each being adjacent a motive area of the respective diaphragms and being adapted to be progressively engaged and disengaged by said diaphragms upon movement thereof so as to progressively change the effective size of the motive areas which are responsive to the respective fluid pressures prevailing in said chambers.

13. The valve of claim 12 wherein said inclined surfaces are afforded by a series of fingers extending radially inwardly and whose opposite surfaces converge from their outer toward their inner ends, and a follower member interconnecting said diaphragms, said follower member including a series of fingers extending radially outwardly in meshing relationship with said first mentioned fingers, said second mentioned fingers having opposite surfaces which converge from their inner towards their outer ends.

14. A fluid pressure control valve comprising a casing having a pair of fluid pressure chambers, normally closed valve means movable between opened and closed positions for controlling the flow of fluid pressure between said chambers, a pair of fluid pressure responsive members exposed respectively to the pressures in said chambers, one of said members being a diaphragm, said members being operatively connected to said valve means and movable in unison in response to changes in pressure in the respective chambers so as to effect movement of said valve means between opened and closed positions, and a relatively stationary member having an inclined surface in the path of movement of said diaphragm and being adapted to be progressively engaged and disengaged by said diaphragm upon movement thereof so as to progressively change the effective size of its motive area.

15. A variable pressure ratio valve comprising a casing having inlet, delivery and exhaust ports, a pressure responsive member having a motive area exposed to the pressure at said inlet port, a diaphragm connected to said member and having a variable motive area spaced from the motive area of said member, a plurality of fixed fingers extending radially inwardly from said casing, said fingers having an inclined surface engageable by said diaphragm, a plurality of fingers extending radially outwardly from said member in interlocking relationship with said fixed fingers, said second named fingers having a surface oppositely inclined to the surface of said first fingers and adapted to progressively engage said diaphragm and correspondingly disengage it from said fixed fingers as said member and diaphragm are moved in one direction in response to pressure at said inlet port and vice versa when said diaphragm and member are moved in the opposite direction responsive to pressure at said delivery port, valve means operatively connected to said member and diaphragm and including a normally closed inlet valve and a normally open exhaust valve for simultaneously controlling connections between said inlet and delivery ports and said delivery and exhaust ports, said valve means including an adjustable valve seat between said delivery and exhaust ports for effecting disconnection of said delivery and exhaust ports before connection of said delivery and inlet ports and vice versa depending on the direction of movement of said member and diaphragm, and means for adjusting the position of said valve seat.

16. The valve of claim 9 wherein said fluid pressure-responsive element includes a part subjected at all times to the pressure of the fluid at said inlet for balancing the effect of fluid pressure acting on said first valve member when the latter and the second valve member are closed upon their respective seat members.

17. The valve of claim 15 including fluid pressure responsive control means for effecting adjustment of said adjusting means.

18. The valve device of claim 17 wherein said control means includes a part subjected at all times to fluid pressure at said inlet port for balancing the effect of fluid pressure acting on said valve means when the latter is closed.

References Cited in the file of this patent

UNITED STATES PATENTS

| | | |
|---|---|---|
| 2,033,842 | McFarland | Mar. 10, 1936 |
| 2,313,991 | Fitch | Mar. 16, 1943 |
| 2,370,582 | Rodway | Feb. 27, 1945 |
| 2,747,599 | Watson | May 29, 1956 |
| 2,950,147 | Neubeck | Aug. 23, 1960 |
| 3,011,833 | Stelzer | Dec. 5, 1961 |